United States Patent
Kim

(10) Patent No.: US 11,339,791 B2
(45) Date of Patent: *May 24, 2022

(54) HIGH-SPEED DUAL TURBO MACHINE ENABLING COOLING THERMAL EQUILIBRIUM

(71) Applicant: TURBOWIN CO., LTD., Cheongju-si (KR)

(72) Inventor: Minsoo Kim, Daejeon (KR)

(73) Assignee: TURBOWIN CO., LTD., Cheongju-si (KR)

( * ) Notice: Subject to any disclaimer, the term of this patent is extended or adjusted under 35 U.S.C. 154(b) by 158 days.

This patent is subject to a terminal disclaimer.

(21) Appl. No.: 16/888,201

(22) Filed: May 29, 2020

(65) Prior Publication Data

US 2020/0392901 A1 Dec. 17, 2020

(30) Foreign Application Priority Data

Jun. 13, 2019 (KR) ........................ 10-2019-0069846

(51) Int. Cl.
*F04D 25/08* (2006.01)
*F02C 7/18* (2006.01)
*F04D 25/16* (2006.01)
*F04D 25/06* (2006.01)
(Continued)

(52) U.S. Cl.
CPC ............ *F04D 25/082* (2013.01); *F02C 7/185* (2013.01); *F04D 17/105* (2013.01); *F04D 25/0606* (2013.01); *F04D 25/163* (2013.01); *F04D 29/441* (2013.01)

(58) Field of Classification Search
CPC .......... H02K 5/20; H02K 5/207; F04D 17/12; F04D 25/16; F04D 29/582; F04D 29/5833; F04D 29/584; F04D 29/5806; F04D 29/5846
See application file for complete search history.

(56) References Cited

U.S. PATENT DOCUMENTS

2015/0247506 A1* 9/2015 Lee .................... F04D 29/4213
417/366
2015/0308456 A1* 10/2015 Thompson .......... F04D 29/5806
417/244
2018/0172028 A1* 6/2018 Kim ...................... F04D 25/16

FOREIGN PATENT DOCUMENTS

CN 106663973 A 5/2017
DE 112016004014 T5 6/2018
EP 2918847 A1 9/2015
(Continued)

*Primary Examiner* — Kenneth J Hansen
(74) *Attorney, Agent, or Firm* — Rabin & Berdo, P.C.

(57) ABSTRACT

A high-speed dual turbo machine enabling cooling thermal equilibrium. The high-speed dual turbo machine maximizing the cooling efficiency thereof by compressing and discharging external air suctioned therein at both ends, cooling an air compressor in a suction air-cooling method, decreasing a flow path of air for cooling the inside of the dual turbo machine and the air compressor, and optimizing the flow path. Accordingly, the present invention uses the suction air-cooling method and guides the flow of air for cooling the turbo machine through a specific path, so that it 15 maximizes the efficiency and durability of the turbo machine, the cost reduction owing to the structural simplification of the turbo machine, and the easiness of maintenance by preventing an increase in temperature of the inside of the turbomachine casing (100) and the air compressor (200).

1 Claim, 4 Drawing Sheets

(51) Int. Cl.
 *F04D 17/10* (2006.01)
 *F04D 29/44* (2006.01)

(56) References Cited

FOREIGN PATENT DOCUMENTS

| | | | |
|---|---|---|---|
| JP | 2018526571 | A | 9/2018 |
| KR | 10-1377057 | B1 | 3/2014 |
| KR | 10-1607492 | B1 | 4/2016 |
| KR | 10-1847165 | B1 | 4/2018 |

\* cited by examiner

— AF1
----- AF2

HIGH-SPEED DUAL TURBO MACHINE ENABLING COOLING THERMAL EQUILIBRIUM

BACKGROUND OF THE INVENTION

Field of the Invention

The present invention relates to a high-speed dual turbo machine enabling cooling thermal equilibrium and, more particularly, to a high-speed dual turbo machine enabling cooling thermal equilibrium, the high-speed dual turbo machine maximizing the cooling efficiency thereof by compressing and discharging external air suctioned therein at both ends, cooling an air compressor in a suction air-cooling method, decreasing a flow path of air for cooling the inside of the dual turbo machine and the air compressor, and optimizing the flow path.

Description of the Related Art

In general, a turbo machine is an apparatus for compressing a gas by a rotation of an impeller.

Such a turbo machine has already been published in a variety of technologies and many kinds of turbo machines having a suitable shape and a specification suitable for the environment of an industrial site have been released.

Also in order to increase the efficiency of the conventional turbo machine, a complex design change for a shape or a cooling method of the impeller and a cooling means and techniques for improving the efficiency and cooling performance of the turbo machine manufactured based on the same have been variously proposed.

However, the increase of the technical skills for the turbo machine complicates the structure of the turbo machine, thereby increasing the cost of the turbo machine.

This, rather, decreases the durability and efficiency of the turbomachinery (energy loss due to the complex structure of the turbo machine) and causes a problem in that maintenance and repair due to failure thereof are difficult.

The turbo machine is not only efficient, but also excellent in durability and manageability, but it is ideal that the structure thereof is simple and the cooling thereof is good.

Accordingly, the present invention provides the most ideal turbo machine capable of solving the conventional problems.

As the prior art related to a high-speed turbo machine for cooling thermal equilibrium, "a turbo blower" of Korea Patent registration No. 10-1377057 (hereinafter referred to as "Patent Literature 1") is disclosed.

The turbo blower includes a driving part which is arranged in one side of the inner space of a main body and sends outdoor air induced through inlets formed in the lower part of the main body by inhaling the outdoor air, and a control part which is arranged in the other side of the inner space of the main body.

Walls in which sound-absorbing materials are attached to both sides are arranged in the lower space of the main body to be separated from each other. The inlets are respectively arranged at the both sides of the lower part of the main body facing each other. The outdoor air induced through the inlet is induced to the driving part after the flow directions of the outdoor air induced through the inlet are frequently changed by the walls.

Accordingly, noise, which is generated in the driving part of the main body and is delivered to the outside, can be reduced by forming multiple walls in the main body and forming air inlets in both sides.

As another prior art related to a high-speed turbo machine for cooling thermal equilibrium, "a direct drive-type dual turbo blower cooling structure" of Korea Patent registration No. 10-1607492 (hereinafter referred to as "Patent Literature 2") is disclosed.

It relates to a direct drive type dual turbo blower cooling structure in which a plurality of hole portions for cooling a stator and a plurality of hole portions for cooling a coil portion, a bearing housing, and a rotor are formed along the inner diameter of a motor casing; impellers are disposed on both sides thereof, such that a flow rate is doubled; and an air cooling system capable of achieving thermal balance through the plurality of hole portions is implemented at the time of operation of a cooling fan which provides an air cooling system instead of a conventional water cooling system. Accordingly, it is possible to simplify the mechanical structure and reduce manufacturing time and costs because the pump, heat exchanger, water tank, pipes, etc. required for a water cooling system are unnecessary.

As described above, the Patent Literature 1 and the Patent Literature 2 belong to the same technical field as the present invention. In contrast to the present invention, there are some similar and identical technical concepts in terms of the subject matters and solution to be solved by the invention. If the present invention and the conventional arts belong to the same technical field, they contain the essential components.

That is, the impeller, the motor, the cooling means, etc. are the most basic components that must be constructed in the turbo machine field.

However, the Patent Literature 1 to the Patent Literature 2 and the present invention are different in terms of their specific components and cooling methods for compressing external air and cooling the turbo machine.

Accordingly, the present invention is to solve the technical features of the present invention, based on the subject matters (object of the invention) to be solved by the invention, the solution (components) for solving the same, and the effects according to the solution of the invention, which are different from the related art of the conventional turbo machine including the Patent Literature 1 to the Patent Literature 2.

PATENT LITERATURE

Patent Literature 1: Korean Patent Registration No. 10-1377057 (Mar. 17, 2014)
Patent Literature 2: Korean Patent Registration No. 10-1607492 (Mar. 24, 2016)

SUMMARY OF THE INVENTION

The present invention has been made in an effort to solve the problems in the related art described above, and an object of the present invention is to provide a dual turbo machine that makes air flow through a shortest path by cooling the inside using a suction air-cooling method and minimizing the flow of air suctioned inside.

In particular, an object is to maximize the cooling efficiency of a dual turbo machine by making external air, which is suctioned in the dual turbo machine to cool an air compressor, flow through a specific path.

According to an aspect of the invention to achieve the object described above, there is provided a high-speed dual turbo machine enabling cooling thermal equilibrium, including:

a dual turbo machine casing discharging suctioned external air through a specific path and protecting an air compressor from the outside;

the air compressor disposed and coupled in the dual turbo machine casing, suctioning external air into the dual turbo machine casing, and compressing the external air suctioned in the dual turbo machine casing; and a shortest path cooling structure system disposed at a side of the dual turbo machine casing and cooling the air compressor disposed in the dual turbo machine casing through a shortest path, wherein the shortest path cooling structure system includes:

a cooling air intake port formed through a side of the dual turbo machine casing and allowing external air for cooling the air compressor to flow into the dual turbo machine casing;

a cooling air exhaust port allowing external air having been suctioned in the dual turbo machine casing through the cooling air intake port and having cooled the air compressor to be discharged outside;

a cooling fan assembly coupled to a side of the air compressor, rotating with rotation of the air compressor at the same speed, and suctioning and discharging outside the internal air of the dual turbo machine casing and the external air suctioned through the cooling air intake port to cool the air compressor; and a shortest-path generator enabling smooth circulation of air in the dual turbo machine casing having the air compressor therein by reducing a contact time between the air compressor and the external air suctioned into the dual turbo machine casing to cool the air compressor, wherein the cooling air intake port has:

first cooling air intake holes formed at an end portion of a power generation chamber of the dual turbo machine casing so that external air to cool the inside of the power generation chamber and the air compressor is suctioned into the power generation chamber; and second cooling air intake holes formed at the other end portion of the power generation chamber of the dual turbo machine casing so that external air to cool the inside of the power generation chamber and the air compressor is suctioned into the power generation chamber, whereby external air for cooling the inside of the power generation chamber and the air compressor is suctioned into the power generation chamber, wherein the shortest-path generator includes:

a shortest-path security cover plate extending and protruding a predetermined distance from the other side of the power generation chamber of the dual turbo machine casing to the first external air compression chamber and guiding the internal air of the power generation chamber into the cooling fan assembly through a shortest path;

a post-cooling air inlet formed at the shortest-path security cover plate and allowing the internal air of the power generation chamber of the dual turbo machine casing to be suctioned first therethrough in order to be discharged outside through a shortest path; and a cooling fan-side guide channel extending from the post-cooling air inlet and guiding internal air suctioned through the post-cooling air inlet to the cooling fan assembly, whereby the internal air of the power generation chamber of the dual turbo machine casing and external air suctioned through the first cooling air intake holes and the second cooling air intake holes cool the power generation chamber and the air compressor and is then discharged through a shortest path, wherein the cooling fan assembly is coupled to the other end of a shaft opposite a first impeller in the opposite direction to the first impeller and in the same direction as a second impeller to suck the internal air of the power generation chamber and the external air suctioned through the first cooling air intake holes and the second cooling air intake holes, through a specific path, the specific path, which is a path defined by organic coupling relationships of the components of the dual turbo machine casing, the air compressor, and the shortest-path cooling structure system to maximize the effect of the cooling efficiency of the dual turbo machine, includes:

a first optimal flow path allowing external air to be suctioned through the first cooling air intake holes, to come in contact with the air compressor, to take heat from the air compressor, to immediately flow into the post-cooling air inlet, to be suctioned to the cooling fan assembly through the cooling fan-side guide channel, and then to be discharged outside through the cooling air exhaust port; and a second optimal flow path allowing external air to be suctioned through the second cooling air intake holes, to come in contact with the air compressor, to take heat from the air compressor, to immediately flow into the post-cooling air inlet, to be suctioned to the cooling fan assembly through the cooling fan-side guide channel, and then to be discharged outside through the cooling air exhaust port, whereby the internal air of the dual turbo machine casing and the external air suctioned through the cooling air intake port are guided to flow through the first optimal flow path and the second optimal flow path generated by the shortest-path cooling structure system, whereby cooling the air compressor in the dual turbo machine casing.

In the meantime, it should be understood that the terminology or the words used in claims should not be interpreted in normally or lexically sense. It should be interpreted as meaning and concept consistent with the technical idea of the present invention, based on the principle that the inventor can properly define the concept of the term in order to describe its invention in the best way.

Therefore, the embodiments described in the present specification and the configurations shown in the drawings are only the most preferred embodiments of the present invention, and not all the technical ideas of the present invention are described. Therefore, it is to be understood that various equivalents and modifications are possible.

BRIEF DESCRIPTION OF THE DRAWINGS

The above and other objects, features and advantages of the present invention will be more apparent from the following detailed description taken in conjunction with the accompanying drawings, in which.

REFERENCE SIGNS LIST

Figure 1:
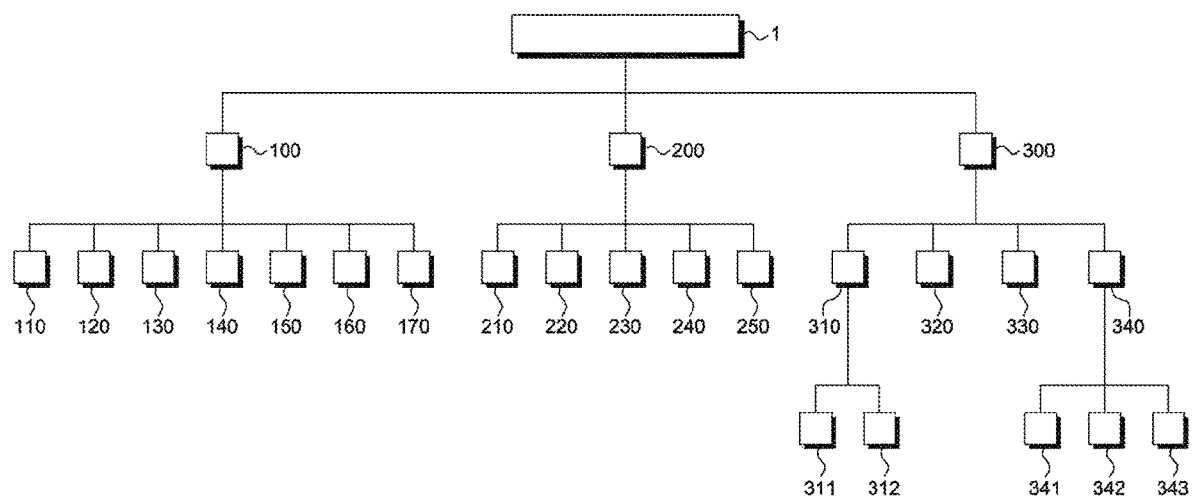
FIG. 1 is a view showing the configuration of a high-speed dual turbo machine enabling cooling thermal equilibrium of the present invention.

1: high-speed dual turbo machine enabling cooling thermal equilibrium
100: turbo machine casing
110: first external air compression chamber
120: second external air compression chamber
130: power generation chamber
140: first external air intake duct
150: second external air intake duct
160: first compressed air exhaust duct
170: second compressed air exhaust duct
200: air compressor
210: stator
220: rotor
230: shaft
240: first impeller
250: second impeller
300: shortest path cooling structure system
310: cooling air intake port
311: first cooling air intake holes
312: second cooling air intake holes
320: cooling air exhaust port
330: cooling fan assembly
340: shortest-path generator
341: shortest-path security cover plate
342: post-cooling air inlet
343: cooling fan-side guide channel
S100: power supply step
S200: air compressor operation step
S300: first impeller rotation step
S400: first external air suction step
S500: first external air compression step
S600: first compressed air discharge step
S700: second impeller rotation step
S800: second external air suction step
S900: second external air compression step
S1000: second compressed air discharge step
S1100: cooling fan rotation step
S1200: internal air suction step
S1300: cooling air suction step
S1400: shortest path generation step
S1500: air discharge step
AF1: first optimal flow path
AF12: second optimal flow path

DETAILED DESCRIPTION OF THE PREFERRED EMBODIMENT

Hereinafter, functions, components, and actions of the high-speed dual turbo machine enabling cooling thermal equilibrium of the present invention will be described in more detail with reference to the accompanying drawings.

Figure 2:
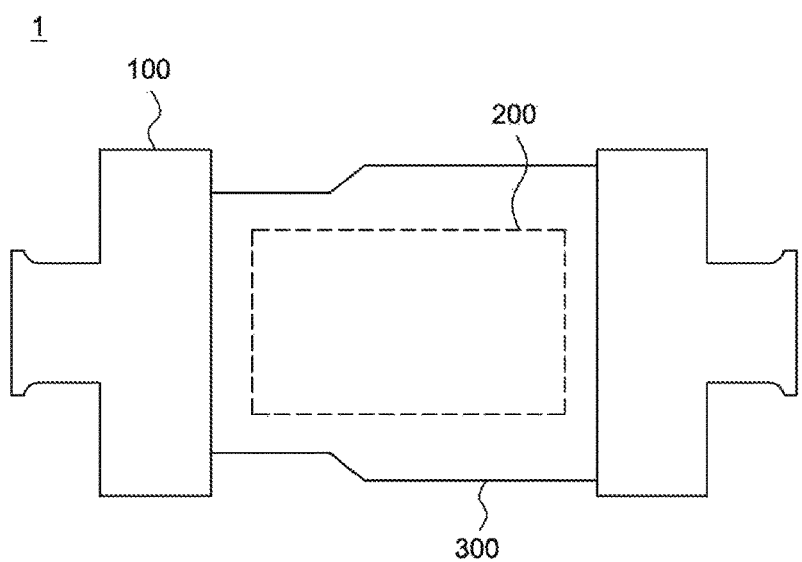
FIG. 2 is a schematic view of the high-speed dual turbo machine enabling cooling thermal equilibrium of the present invention.
Figure 3:
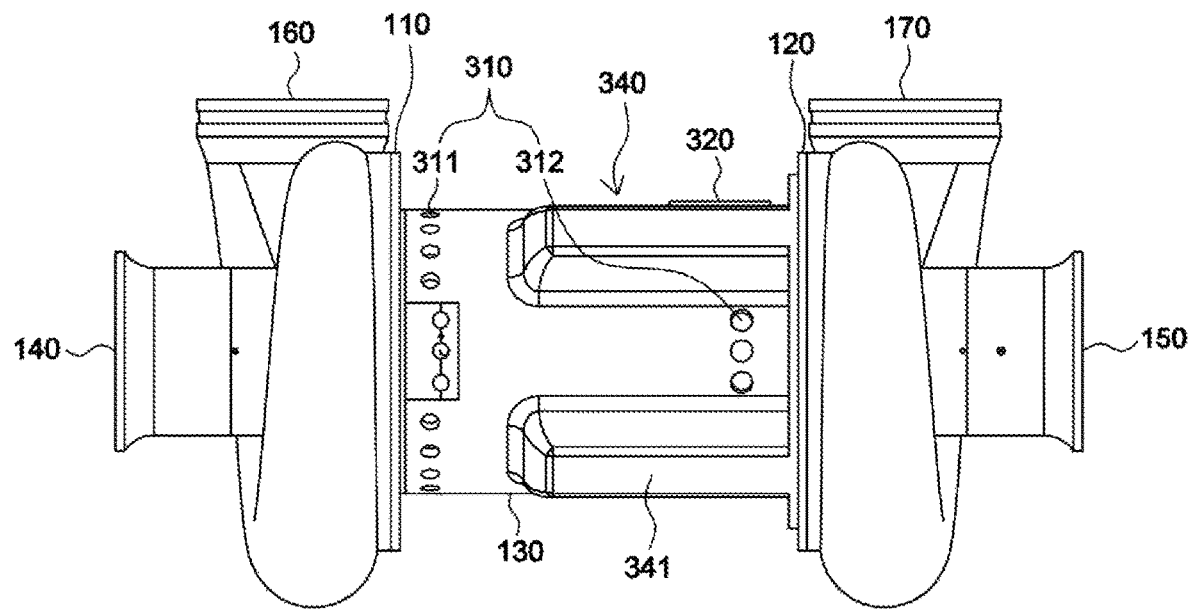
FIG. 3 is a front view of the high-speed dual turbo machine enabling cooling thermal equilibrium of the present invention.
Figure 4:
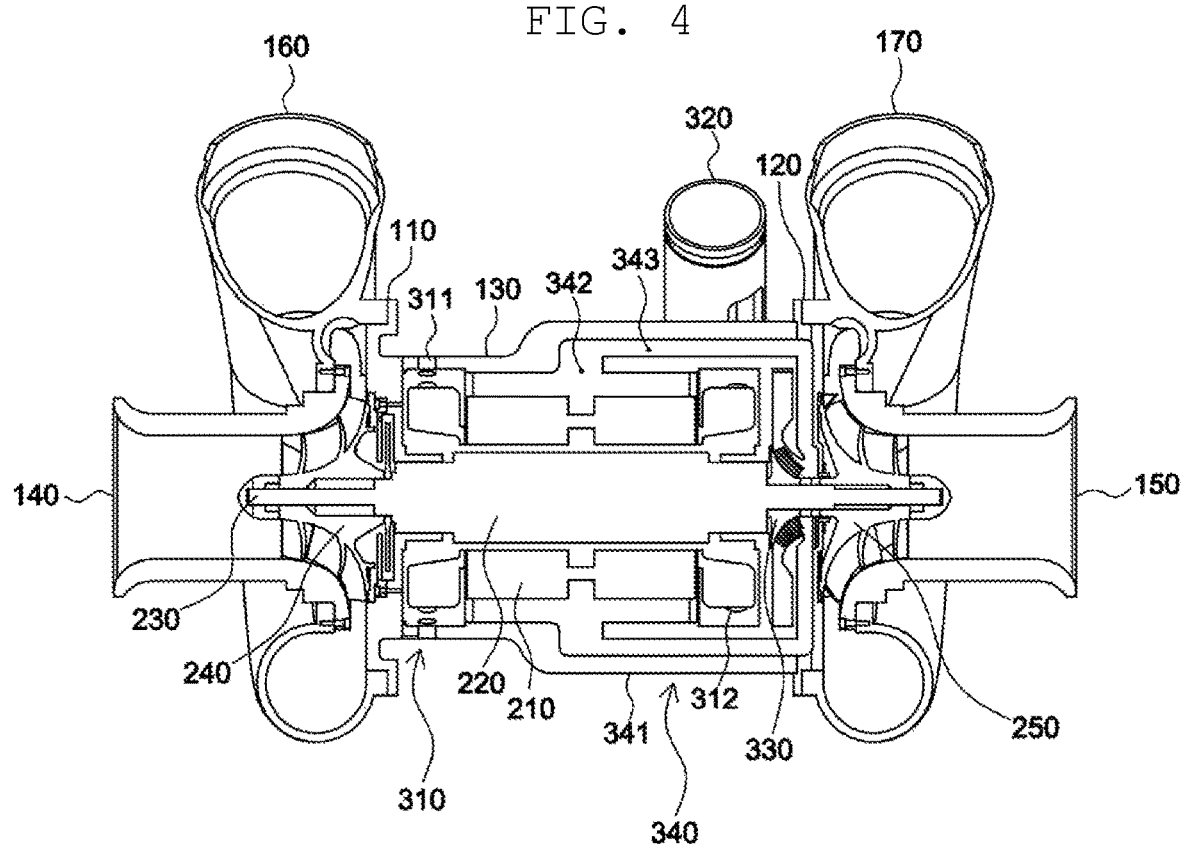
FIG. 4 is a cross-sectional view of the high-speed dual turbo machine enabling cooling thermal equilibrium of the present invention.

FIG. 1 is a view showing the configuration of a high-speed dual turbo machine enabling cooling thermal equilibrium of the present invention, FIG. 2 is a schematic view of the high-speed dual turbo machine enabling cooling thermal equilibrium of the present invention, FIG. 3 is a front view of the high-speed dual turbo machine enabling cooling thermal equilibrium of the present invention, and FIG. 4 is a cross-sectional view of the high-speed dual turbo machine enabling cooling thermal equilibrium of the present invention.

As shown in FIGS. 1 to 4, the present invention relates to a high-speed dual turbo machine (1) enabling cooling thermal equilibrium, the high-speed dual turbo machine including:

a dual turbo machine casing (100) discharging suctioned external air through a specific path and protecting an air compressor (200) from the outside;

the air compressor (200) disposed and coupled in the dual turbo machine casing (100), suctioning external air into the dual turbo machine casing (100), and compressing the external air suctioned in the dual turbo machine casing (100); and a shortest path cooling structure system (300) disposed at a side of the dual turbo machine casing (100) and cooling the air compressor (200) in the dual turbo machine casing (100) through a shortest path, in which the shortest-path cooling structure system (300) includes:

a cooling air intake port (310) formed through a side of the dual turbo machine casing (100) and allowing external air for cooling the air compressor (200) to flow into the dual turbo machine casing (100);

a cooling air exhaust port (320) allowing external air having been suctioned in the dual turbo machine casing (100) through the cooling air intake port (310) and having cooled the air compressor (200) to be discharged outside;

a cooling fan assembly (330) coupled to a side of the air compressor (200), rotating with rotation of the air compressor (200) at the same speed, and suctioning and discharging outside the internal air of the dual turbo machine casing (100) and the external air suctioned through the cooling air intake port (310) to cool the air compressor (200); and a shortest-path generator (340) enabling smooth circulation of air in the dual turbo machine casing (100) having the air compressor (200) therein by reducing a contact time between the air compressor (200) and the external air suctioned into the dual turbo machine casing (100) to cool the air compressor (200), and the internal air of the dual turbo machine casing (100) and the external air suctioned through the cooling air intake port (310) are guided to flow through a first optimal flow path (AF1) and a second optimal flow path (AF2) generated by the shortest path cooling structure system (300), whereby cooling the air compressor (200) in the dual turbo machine casing (100).

That is, the present invention relates to a dual turbo machine in which external air is suctioned through both ends of the dual turbo machine casing (100) and then compressed and discharged by rotation of the air compressor (200), the internal air of the dual turbo machine casing (100) and the external air suctioned through the cooling air intake port (310) are suctioned by the cooling fan assembly (330) such that air taking the heat of the air in the dual turbo machine casing (100) and the heat of the air compressor (200) is discharged to the outside, and the air taking the heat is guided to be discharged outside through a shortest path such that the air in the dual turbo machine casing (100) is quickly circulated and replaced, thereby maximizing the cooling efficiency.

The present invention is described in more detail in terms of configuration.

The dual turbo machine casing (100) protecting the air compressor (200) from the outside and guiding flow and discharge of external air suctioned therein by rotation of the air compressor (200) includes:

a first external air compression chamber (110) in which external air suctioned inside is compressed;

a second external air compression chamber (120) that is spaced a predetermine distance apart from the first external air compression chamber (110) and in which external air suctioned inside is compressed;

a power generation chamber (130) disposed and hermetically coupled between the first external air compression chamber (110) and the second external air compression chamber (120) and generating power to compress the external air suctioned in the first external air compression chamber (110) and the second external air compression chamber (120);

a first external air intake duct (140) formed at an end of the first external air compression chamber (110) to suck external air;

a second external air intake duct (150) formed at an end of the second external air compression chamber (120) to suck external air;

a first compressed air exhaust duct (160) formed at a side of the first external air compression chamber (110) to discharge compressed air; and a second compressed air exhaust duct (170) formed at a side of the second external air compression chamber (120) to discharge compressed air, in which the air compressor (200) is partially seated and coupled in the first external air compression chamber (110), the second external air compression chamber (120), and the power generation chamber (130); and external air is suctioned through the first external air intake duct (140) and the second external air intake duct (150), the suctioned air is compressed in the first external air compression chamber (110) and the second external air compression chamber (120), and the compressed air is discharged outside through the first compressed air exhaust duct (160) and the second compressed air exhaust duct (170) by the power generated by the air compressor (200).

Further, the air compressor (200) disposed in the power generation chamber (130) of the dual turbo machine casing (100) and generating power for suctioning external air into the first external air compression chamber (110) and the second external air compression chamber (120) of the dual turbo machine casing (100) and for compressing and discharging the suctioned external air includes:

a stator (210) that is a fixed part;

a rotor (220) that is a rotary part;

a shaft (230) coupled to the rotor (220) and disposed through the first external air compression chamber (110), the second external air compression chamber (120), and the power generation chamber (130);

a first impeller (240) coupled to an end of the shaft (230), disposed in the first external air compression chamber (110), and suctioning, compressing and discharging external air; and a second impeller (250) coupled to the other end of the shaft (230), disposed in the second external air compression chamber (120), and suctioning, compressing and discharging external air, in which external air is suctioned, compressed, and discharged in the first external air compression chamber (110) and the second external air compression chamber (120) by the first impeller (240) and the second impeller (250) that are rotated at a high speed.

When the stator (210) is a stator (210) that comprises a separation type drum, as in the embodiment shown in FIG. 4, it is possible to maximize the cooling efficiency of the present invention.

Further, the shortest path cooling structure system (300) disposed at a side of the power generation chamber (130) of the dual turbo machine casing (100) and maximizing the cooling efficiency and energy efficiency by preventing an increase in temperature in the power generation chamber (130) includes, as described above:

a cooling air intake port (310) formed through a side of the dual turbo machine casing (100) and allowing external air for cooling the air compressor (200) to flow into the dual turbo machine casing (100);

a cooling air exhaust port (320) allowing external air having been suctioned in the dual turbo machine casing (100) through the cooling air intake port (310) and having cooled the air compressor (200) to be discharged outside;

a cooling fan assembly (330) coupled to a side of the air compressor (200), rotating with rotation of the air compressor (200) at the same speed, and suctioning and discharging outside the internal air of the dual turbo machine casing (100) and the external air suctioned through the cooling air intake port (310) to cool the air compressor (200); and a shortest-path generator (340) enabling smooth circulation of air in the dual turbo machine casing (100) having the air compressor (200) therein by reducing a contact time between the air compressor (200) and the external air suctioned into the dual turbo machine casing (100) to cool the air compressor (200), in which the cooling air intake port (310) has:

first cooling air intake holes (311) formed at an end portion of the power generation chamber (130) of the dual turbo machine casing (100) so that external air to cool the inside of the power generation chamber (130) and the air compressor (200) is suctioned into the power generation chamber (130); and second cooling air intake holes (312) formed at the other end portion of the power generation chamber (130) of the dual turbo machine casing (100) so that external air to cool the inside of the power generation chamber (130) and the air compressor (200) is suctioned into the power generation chamber (130), whereby external air for cooling the inside of the power generation chamber (130) and the air compressor (200) is sufficiently suctioned into the power generation chamber (130).

The shortest-path generator (340) includes:

a shortest-path security cover plate (341) extending and protruding a predetermined distance from the other side of the power generation chamber (130) of the dual turbo machine casing (100) to the first external air compression chamber (110) and guiding the internal air of the power generation chamber (130) into the cooling fan assembly (330) through a shortest path;

a post-cooling air inlet (342) formed at the shortest-path security cover plate (341) and allowing the internal air of the power generation chamber (130) of the dual turbo machine casing (100) to be suctioned first therethrough in order to be discharged outside through a shortest path; and a cooling fan-side guide channel (343) extending from the post-cooling air inlet (342) and guiding internal air suctioned through the post-cooling air inlet (342) to the cooling fan assembly (330), whereby, the internal air of the power generation chamber (130) of the dual turbo machine casing (100) and external air suctioned through the first cooling air intake holes (311) and the second cooling air intake holes (312) cool the power generation chamber (130) and the air compressor (200) and is then discharged through a shortest path.

The cooling fan assembly (330) is coupled to the other end of the shaft (230) opposite the first impeller (240) in the opposite direction to the first impeller (240) and in the same direction as the second impeller (250) to suck the internal air of the power generation chamber (130) and the external air suctioned through the first cooling air intake holes (311) and the second cooling air intake holes (312), through a specific path.

That is, the specific path is the same as the shortest path described herein and means a path defined by organic coupling relationships of the components of the dual turbo machine casing (100), the air compressor (200), and the shortest path cooling structure system (300) to maximize the effect of the cooling efficiency of the dual turbo machine.

Figure 6:
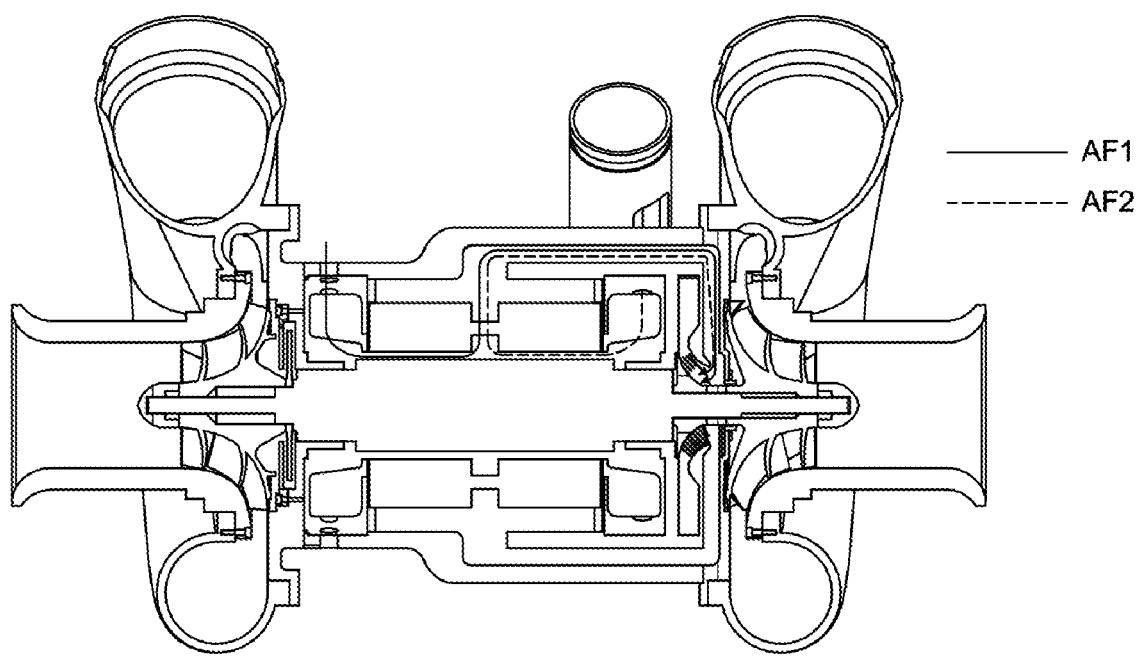
FIG. 6 shows an embodiment visualizing a first optimal flow path and a second optimal flow path that are generated by the shortest path cooling structure system of the components of the high-speed dual turbo machine enabling cooling thermal equilibrium of the present invention.

The specific path, as shown in FIG. 6, corresponds to: a first optimal flow path (AF1) allowing external air to be suctioned through the first cooling air intake holes (311), to come in contact with the air compressor (200), to take heat from the air compressor (200), to immediately flow into the post-cooling air inlet (342), to be suctioned to the cooling fan assembly (330) through the cooling fan-side guide channel (343), and then to be discharged outside through the cooling air exhaust port (320); and a second optimal flow path (AF2) allowing external air to be suctioned through the second cooling air intake holes (312), to come in contact with the air compressor (200), to take heat from the air compressor (200), to immediately flow into the post-cooling air inlet (342), to be suctioned to the cooling fan assembly (330) through the cooling fan-side guide channel (343), and then to be discharged outside through the cooling air exhaust port (320).

That is, the present invention provides the effect of maximum cooling efficiency by using the advantages of an air-cooling method, a suction cooling method, and the stator (210) having a separation type drum structure and harmonically and organically applying the advantages with the shortest path cooling structure system (300).

The most important advantage of the air-cooling method is to perform cooling by allowing air to prevent an increase in temperature of the stator (210), the rotor (220), and the shaft (230) by uniformly coming in contact with the stator (210), the rotor (220), and the shaft (230) and taking heat from them while flowing through a specific path.

The most important advantage of the suction cooling method is that it is not a method of cooling the power generation chamber (130) by flowing a large amount of external into the power generation chamber (130) but is to easily decrease the internal temperature of the power generation chamber (130) by suctioning the internal air of the power generation chamber (130), which is higher or lower in temperature than external air, and discharging to the outside at a high speed without cooling the power generation chamber (130) by flowing a large amount of external air into the power generation chamber (130), and is to cool the power generation chamber (130) using the external air that is suctioned into the power generation chamber (130) by a pressure difference between the power generation chamber (130) and the outside and is quickly suctioned with the internal air of the power generation chamber (130).

Further, the advantage of the stator (210) having a separation type drum structure is to maximize the effect by the shortest path cooling structure system (300) of the present invention.

That is, the advantage of the stator (210) having a separation type drum structure is to quickly and uniformly cool the entire power generation chamber (130) and air compressor (200), using the first optimal flow path (AF1) and the second optimal flow path (AF2) that are generated by the shortest path cooling structure system (300).

Figure 5:
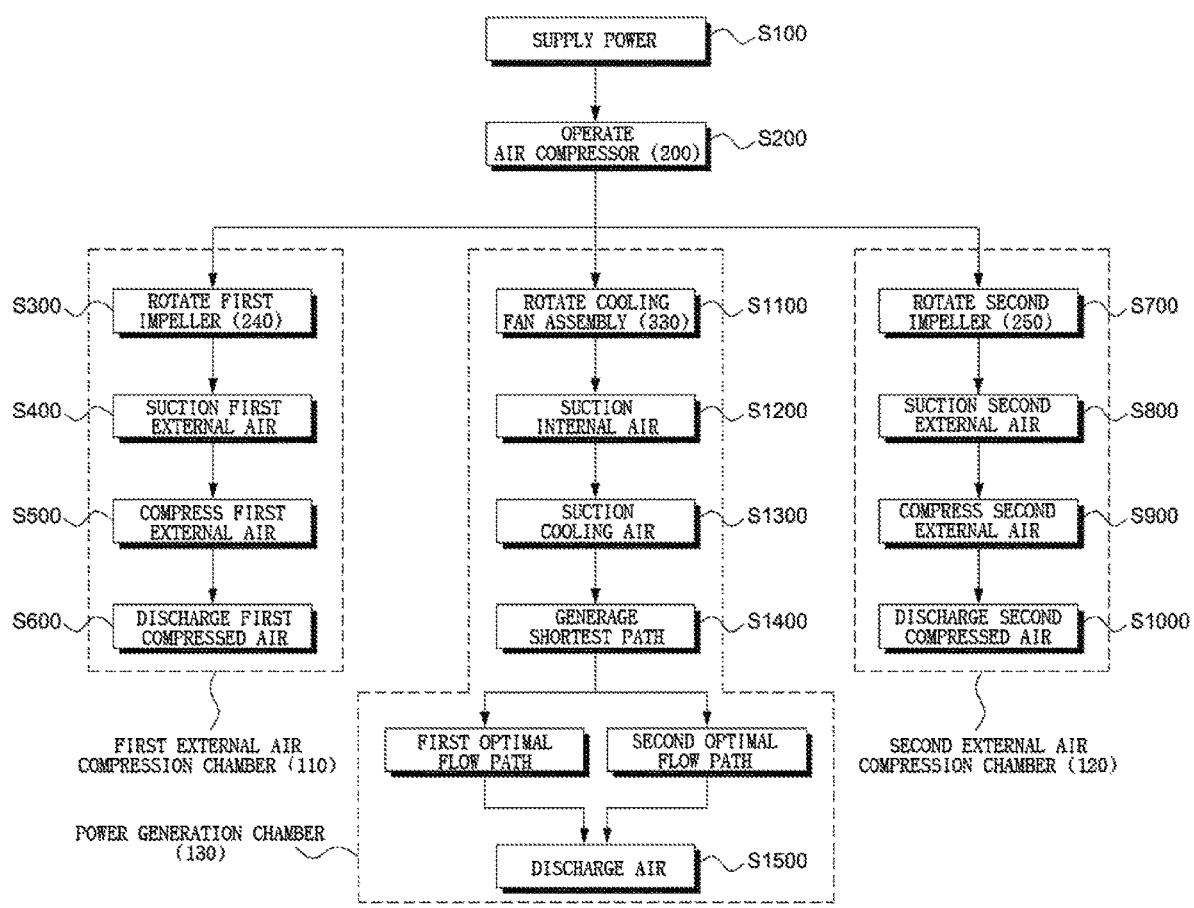
FIG. 5 is a schematic flow chart showing the operation of the high-speed dual turbo machine enabling cooling thermal equilibrium of the present invention and the flow of air that is suctioned and discharged.

Meanwhile, the operation of the high-speed dual turbo machine (1) enabling cooling thermal equilibrium of the present invention and the flow of air that is suctioned and discharged are briefly described with reference to FIG. 5.

When power is supplied to the air compressor (200) (◀S100, power supply step), the rotor (220) is rotated at a high speed (◀S200, air compressor operation step), the first impeller (240) disposed in the first external air compression chamber (110) is rotated at a high speed (◀S300, first impeller rotation step), external air is suctioned into the first external air compression chamber (110) by rotation of the first impeller (240) (◀S400, first external air suction step), the external air suctioned in the first external air compression chamber (110) is compressed by the first impeller (240) (◀S500, first external air compression step), and the compressed air is discharged to the first compressed air exhaust duct (160) (◀S600, first compressed air discharge step).

Further, as the rotor (220) is rotated at a high speed, the second impeller (250) is rotated at a high speed together with the first impeller (240) (◀S700, second impeller rotation step), external air is suctioned into the second external air compression chamber (120) by rotation of the second impeller (250) (◀S800, second external air suction step), the external air suctioned in the second external air compression chamber (120) is compressed by the second impeller (250) (◀S900, second external air compression step), and the compressed air is discharged to the second compressed air exhaust duct (170) (◀S1000, second compressed air discharge step).

Further, in this process, the cooling fan assembly (330) disposed in the power generation chamber (130) suctions the internal air of the power generation chamber (130) and external air flowing inside through the cooling air intake port (310) by simultaneously rotating with rotation of the first impeller (240) and the second impeller (250) (◀S1100, S1200, S1300, cooling fan rotation step, internal air suction step, and cooling air suction step) and, through a shortest path generated in the power generation chamber (130) (◀S1400, shortest path generation step), discharges air having taken heat from the power generation chamber (130) and the air compressor (200) through the cooling air exhaust port (320) (◀S1500, air discharge step), thereby cooling the air compressor (200) and the power generation chamber (130) that generate power to suck external air, compress the suctioned external air, and discharge the compressed air while preventing an increase in temperature thereof.

That is, the present invention relates to a dual turbo machine of which the structure can be simplified and which has maximized cooling efficiency, energy efficiency, and effect of durability by taking and discharging heat generated by the power generation chamber (130) and the air compressor (200) to the outside, using a suction air-cooling method and the shortest path cooling structure system (300).

FIG. 6 shows an embodiment visualizing a first optimal flow path (AF1) and a second optimal flow path (AF2) that are generated by the shortest path-cooling structure system (300) of the components of the high-speed dual turbo machine enabling cooling thermal equilibrium.

For reference, the 'suction air-cooling type' stated herein is a method of suctioning internal air of the power generation chamber (130) of the dual turbo machine casing (100)

having the air compressor (200) therein and discharging to the outside, using a pure air-cooling method.

That is, it is a method of suctioning the internal air of the power generation chamber (130) and the external air suctioned in the power generation chamber (130) through the cooling air intake port (310) and discharging to the outside.

According to the present invention having the configuration and operation described above, the inside of the dual turbo machine casing using the suction air-cooling method and the air compressor are cooled and the flow of air suctioned inside for cooling is optimized, thereby making air flow through a shortest path.

In particular, external air suctioned into the dual turbo machine casing to cool the air compressor is guided to flow a specific path, thereby maximizing the cooling efficiency.

That is, since the path through which the internal air of the dual turbo machine casing and the external air having been suctioned in the dual turbo machine casing and having cooled the air compressor are discharged is reduced and optimized so that that air is discharged to the outside through a shortest path, quick and smooth exchange of the airflow in the dual turbo machine casing is achieved and the cooling efficiency and energy efficiency based on the cooling efficiency is improved.

Further, since the airflow in the dual turbo machine casing is quickly exchanged through a shortest path, the cooling efficiency is maximized. Further, the entire structure of the dual turbo machine is simplified by using the suction air-cooling method.

Therefore, it is possible to reduce the manufacturing cost of the dual turbo machine and maximize the lifespan, durability, efficiency, easiness of maintenance, whereby the present invention is very effective.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The present invention relates to a high-speed dual turbo machine enabling cooling thermal equilibrium and can be applied to contribute to improving various industrial fields, in which the turbo machine is used, such as the manufacturing and sales industries for manufacturing it, and particularly, the general industrial sites of requiring compressed air.

What is claimed is:
1. A high-speed dual turbo machine enabling cooling thermal equilibrium, comprising:
   a dual turbo machine casing discharging suctioned external air through a specific path and protecting an air compressor from an outside environment;
      the air compressor disposed and coupled in the dual turbo machine casing, suctioning the external air into the dual turbo machine casing, and compressing the external air suctioned in the dual turbo machine casing; and
      a shortest path cooling structure system disposed at a side of the dual turbo machine casing and cooling the air compressor disposed in the dual turbo machine casing through a shortest path,
   wherein the shortest path cooling structure system includes:
      a cooling air intake port formed through a side of the dual turbo machine casing and allowing the external air for cooling the air compressor to flow into the dual turbo machine casing;
      a cooling air exhaust port allowing the external air having been suctioned in the dual turbo machine casing through the cooling air intake port and having cooled the air compressor to be discharged outside;
      a cooling fan assembly coupled to a side of the air compressor, rotating with rotation of the air compressor at the same speed, and suctioning and discharging outside internal air of the dual turbo machine casing and the external air suctioned through the cooling air intake port to cool the air compressor; and
      a shortest-path generator enabling smooth circulation of air in the dual turbo machine casing having the air compressor therein by reducing a contact time between the air compressor and the external air suctioned into the dual turbo machine casing to cool the air compressor,
   wherein the cooling air intake port has:
      first cooling air intake holes formed at a first end portion of a power generation chamber of the dual turbo machine casing so that the external air to cool an inside of the power generation chamber and the air compressor is suctioned into the power generation chamber; and
      second cooling air intake holes formed at a second end portion of the power generation chamber of the dual turbo machine casing so that the external air to cool an inside of the power generation chamber and the air compressor is suctioned into the power generation chamber,
   whereby the external air for cooling an inside of the power generation chamber and the air compressor is suctioned into the power generation chamber,
   wherein the shortest-path generator includes:
      a shortest-path security cover plate extending and protruding a predetermined distance from the other side of the power generation chamber of the dual turbo machine casing to an external air compression chamber and guiding the internal air of the power generation chamber into the cooling fan assembly through the shortest path;
      a post-cooling air inlet formed at the shortest-path security cover plate and allowing the internal air of the power generation chamber of the dual turbo machine casing to be suctioned first therethrough in order to be discharged outside through the shortest path; and
      a cooling fan-side guide channel extending from the post-cooling air inlet's and guiding the internal air suctioned through the post-cooling air inlet to the cooling fan assembly,
   whereby the internal air of the power generation chamber of the dual turbo machine casing and the external air suctioned through the first cooling air intake holes and the second cooling air intake holes cool the power generation chamber and the air compressor and is then discharged through the shortest path,
   wherein the cooling fan assembly is coupled to an end of a shaft opposite a first impeller in an opposite direction to the first impeller and in the same direction as a second impeller to suck the internal air of the power generation chamber and the external air suctioned through the first cooling air intake holes and the second cooling air intake holes, through a specific path, the specific path formed by an arrangement of the dual turbo machine casing, the air compressor, and the shortest-path cooling structure system to maximize cooling efficiency of the dual turbo machine, includes:
- a first optimal flow path allowing the external air to be suctioned through the first cooling air intake holes, to come in contact with the air compressor, to take heat from the air compressor, to immediately flow into the post-cooling air inlet to be suctioned to the cooling fan assembly through the cooling fan-side guide channel, and then to be discharged outside through the cooling air exhaust port; and
- a second optimal flow path allowing the external air to be suctioned through the second cooling air intake holes, to come in contact with the air compressor, to take heat from the air compressor, to immediately flow into the post-cooling air inlet to be suctioned to the cooling fan assembly through the cooling fan-side guide channel, and then to be discharged outside through the cooling air exhaust port, whereby the internal air of the dual turbo machine casing and the external air suctioned through the cooling air intake port are guided to flow through the first optimal flow path and the second optimal flow path generated by the shortest-path cooling structure system, whereby cooling the air compressor in the dual turbo machine casing.

* * * * *